United States Patent
Gong

(10) Patent No.: US 9,654,014 B1
(45) Date of Patent: May 16, 2017

(54) ADAPTIVE LEADING EDGE BLANKING TIME GENERATION FOR CURRENT-MODE SWITCH-MODE POWER SUPPLIES

(71) Applicant: Infineon Technologies Austria AG, Villach (AT)

(72) Inventor: Xiaowu Gong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 14/984,951

(22) Filed: Dec. 30, 2015

(51) Int. Cl.
*H02M 3/335* (2006.01)

(52) U.S. Cl.
CPC ............... *H02M 3/33515* (2013.01)

(58) Field of Classification Search
CPC ................................ H02M 3/33515
See application file for complete search history.

(56) References Cited

U.S. PATENT DOCUMENTS

| | | | |
|---|---|---|---|
| 6,144,245 A | 11/2000 | Balogh | |
| 7,151,679 B2 | 12/2006 | Strijker | |
| 9,369,042 B1 * | 6/2016 | Khayat | H02M 1/08 |
| 9,397,573 B2 * | 7/2016 | Spini | H02M 3/33507 |
| 9,401,649 B2 * | 7/2016 | Sasaki | H05B 33/0815 |
| 9,490,712 B2 * | 11/2016 | Chen | H02M 3/33507 |
| 2005/0270807 A1 | 12/2005 | Strijker | |
| 2010/0007409 A1 * | 1/2010 | Wang | H02M 1/32 327/551 |

* cited by examiner

*Primary Examiner* — Emily P Pham
(74) *Attorney, Agent, or Firm* — Shumaker & Sieffert, P.A.

(57) ABSTRACT

A current-mode switch-mode power supply controller includes a switch controller, a falling edge detector, and leading edge blanking (LEB) time logic. The switch controller is arranged to control regulation of an output signal via current-mode regulation by turning a primary switch on and off based on a current sense (CS) signal and an LEB signal, such that the switch controller is arranged to cause the primary switch to remain on while the LEB time signal is asserted. The falling edge detector is arranged to detect a falling edge in the CS signal. The LEB time logic is arranged to provide the LEB time signal such that the assertion of the LEB time signal begins when a gate signal is asserted, and such that the assertion of the LEB time signal ends when the falling edge detector detects the falling edge in the CS signal.

20 Claims, 7 Drawing Sheets

LEB time

Output of comparator $A_0$ point A voltage $V_{CS}$ max. pulse signal short pulse signal gate

ADAPTIVE LEADING EDGE BLANKING TIME GENERATION FOR CURRENT-MODE SWITCH-MODE POWER SUPPLIES

TECHNICAL FIELD

This disclosure relates to current-mode switch-mode power supplies (SMPSs), and more specifically to leading edge blanking time generation for current-mode SMPSs.

BACKGROUND

A current-mode SMPS may be arranged to provide current monitoring of a current sense signal being utilized in the SMPS to provide appropriate current-mode control for the power supply load and may be used on a cycle-by-cycle basis.

One concern for current-mode switch-mode power supply is that when the switching transistor turns on, a leading edge current peak may occur during the transistor turn-on transition, this leading edge current peak being caused by inherent or stray capacitance within the control circuitry. This leading edge current peak, if not filtered out, could cause the control circuit to attempt to switch off the power transistor too early, due to the excessive detected current. The time during such transient switching peaks should be ignored, and is known as the Leading Edge Blanking (or LEB) time.

Typically, LEB time is generated by a current or a resistor used to charge capacitor to generate a short delay time that is used as the LEB time.

SUMMARY

In general, the disclosure relates to a device for current protection that comprises a switch-mode power supply controller. The current-mode switch-mode power supply controller includes a switch controller, a falling edge detector, and leading edge blanking (LEB) time logic. The switch controller is arranged to control regulation of an output signal via current-mode regulation by turning a primary switch on and off based on a current sense (CS) signal and an LEB signal, such that the switch controller is arranged to cause the primary switch to remain on while the LEB time signal is asserted. The falling edge detector is arranged to detect a falling edge in the CS signal. The LEB time logic is arranged to provide the LEB time signal such that the assertion of the LEB time signal begins when a gate signal is asserted, and such that the assertion of the LEB time signal ends when the falling edge detector detects the falling edge in the CS signal.

In some examples, a current-mode switch-mode power supply controller includes a switch controller, a falling edge detector, and leading edge blanking (LEB) time logic. The switch controller is arranged to control regulation of an output signal via current-mode regulation by turning a primary switch on and off based on a current sense (CS) signal and an LEB signal, such that the switch controller is arranged to cause the primary switch to remain on while the LEB time signal is asserted. The falling edge detector is arranged to detect a falling edge in the CS signal. The LEB time logic is arranged to provide the LEB time signal such that the assertion of the LEB time signal begins when a gate signal is asserted, and such that the assertion of the LEB time signal ends when the falling edge detector detects the falling edge in the CS signal.

In some examples, a device for leading edge blanking comprises: a current-mode switch-mode power supply controller, including: a switch controller that is arranged to control regulation of an output signal via current-mode regulation by turning a primary switch on and off via a gate signal based on at least a current sense signal and a leading edge blanking signal, such that the switch controller is arranged to cause the primary switch to remain on while the leading edge blanking signal is asserted; a falling edge detector that is arranged to detect a falling edge in the current sense signal; and leading edge blanking time logic that is arranged to provide the leading edge blanking time signal such that the leading edge blanking signal is asserted during a leading edge blanking time and unasserted otherwise, the assertion of the leading edge blanking time signal begins when the gate signal is asserted, and such that the assertion of the leading edge blanking time signal ends when the falling edge detector detects the falling edge in the current sense signal.

In some examples, a method for leading edge blanking comprises: controlling regulation of an output signal, including: controlling regulation of the output signal via current-mode regulation by turning a primary switch on and off via a gate signal based on at least a current sense signal and a leading edge blanking signal, such that the primary switch is controlled to remain on while the leading edge blanking signal is asserted; detecting a falling edge in the current sense signal; and providing the leading edge blanking time signal such that the leading edge blanking signal is asserted during a leading edge blanking time and unasserted otherwise, the assertion of the leading edge blanking time signal begins when the gate signal is asserted, and such that the assertion of the leading edge blanking time signal ends when the falling edge in the current sense signal is detected.

In some examples, a device for leading edge blanking comprises: means for controlling regulation of an output signal, including: means for controlling regulation of the output signal via current-mode regulation by turning a primary switch on and off via a gate signal based on at least a current sense signal and a leading edge blanking signal, such that the primary switch is controlled to remain on while the leading edge blanking signal is asserted; means for detecting a falling edge in the current sense signal; and means for providing the leading edge blanking time signal such that the leading edge blanking signal is asserted during a leading edge blanking time and unasserted otherwise, the assertion of the leading edge blanking time signal begins when the gate signal is asserted, and such that the assertion of the leading edge blanking time signal ends when the falling edge detector detects the falling edge in the current sense signal.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Non-limiting and non-exhaustive examples of the present disclosure are described with reference to the following drawings.

DETAILED DESCRIPTION

Figure 1:
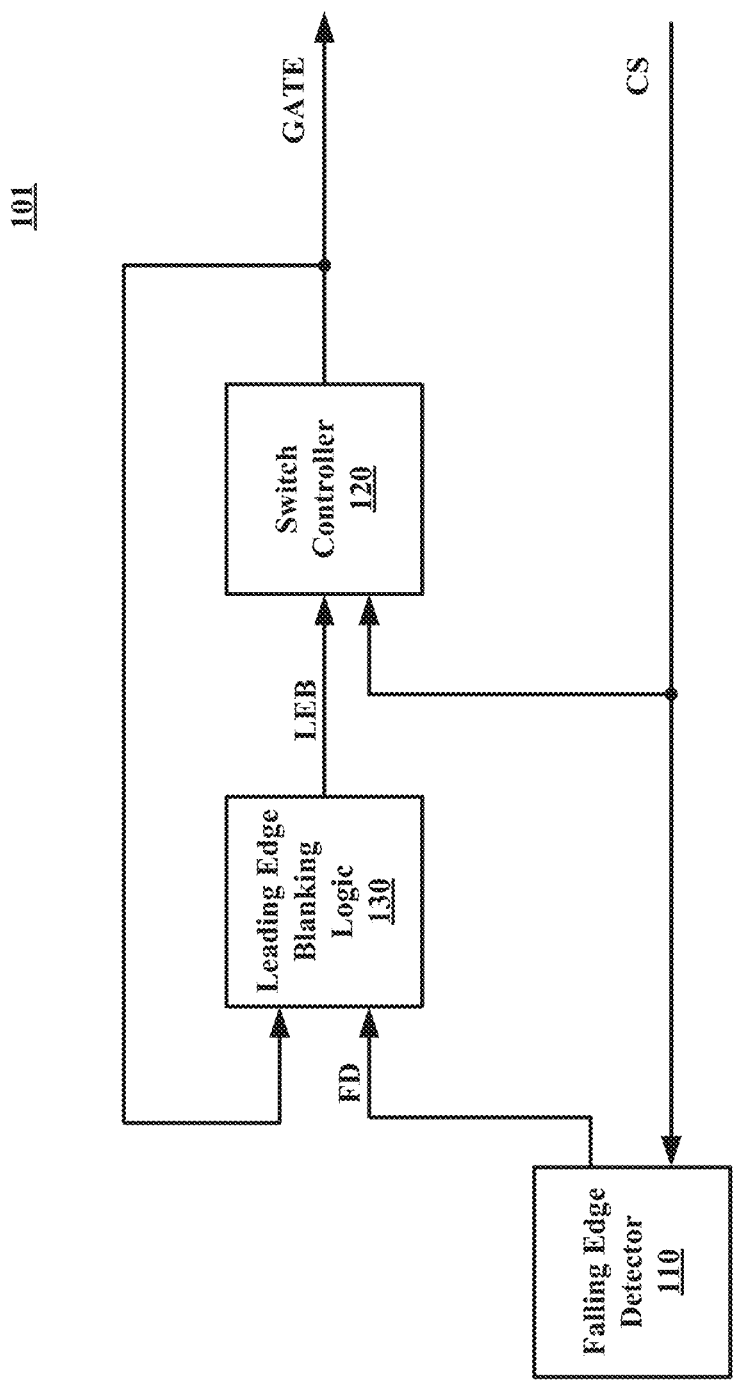
FIG. 1 is a block diagram illustrating an example of a current-mode switch-mode power supply (SMPS) controller.

Various examples of this disclosure will be described in detail with reference to the drawings, where like reference numerals represent like parts and assemblies throughout the several views. Reference to various examples does not limit the scope of this disclosure which is limited only by the scope of the claims attached hereto. Additionally, any examples set forth in this specification are not intended to be limiting and merely set forth some of the many possible examples of this disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," or "in one example," as used herein does not necessarily refer to the same embodiment or example, although it may. Similarly, the phrase "in some embodiments," or "in some examples," as used herein, when used multiple times, does not necessarily refer to the same embodiments or examples, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. Where suitable, the term "gate" is intended to be a generic term covering both "gate" and "base"; the term "source" is intended to be a generic term covering both "source" and "emitter"; and the term "drain" is intended to be a generic term covering both "drain" and "collector." The term "coupled" means at least either a direct electrical connection between the items connected, or an indirect connection through one or more passive or active intermediary devices. The term "signal" means at least one current, voltage, charge, temperature, data, or other signal. The terms "asserted" and "unasserted" refer to particular values of a signal. In some examples, a signal may be considered asserted high such that the signal is asserted when the signal is logic high (e.g., 1) and may be unasserted when the signal is logic low (e.g., 0), and conversely, the signal may instead be asserted low such that the signal is asserted when the signal is logic low (e.g., 0) and may be unasserted when the signal is logic high (e.g., 1). The verb "assert" refers to causing a signal to be asserted, and the term "unassert" refers to causing a signal to be unasserted.

FIG. 1 is a block diagram illustrating an example of current-mode switch-mode power supply (SMPS) controller 101. A current-mode SMPS controller may be arranged so as to be used as part of a current-mode SMPS, and reference to parts or signals not shown in FIG. 1 are references to parts or signals from the current-mode SMPS, which are not shown in FIG. 1 (examples of such parts and signals not shown in FIG. 1 but that are parts or signals from the current-mode SMPS may include, inter alia, the output signal and the primary switch). Current-mode SMPS controller 101 includes switch controller 120, falling edge detector 110, and leading edge blanking time logic 130.

Switch controller 120 is arranged to control regulation of an output signal via current-mode regulation by turning a primary switch on and off via a gate signal GATE based on at least current sense signal CS and leading edge blanking signal LEB, such that switch controller 120 is arranged to cause the primary switch to remain on while leading edge blanking signal LEB is asserted.

Falling edge detector 110 is arranged to detect a falling edge in current sense signal CS. In some examples, information about the detected falling edge is communicated from falling edge detector 110 to leading edge blanking time logic 130 through one or more signals, such as falling edge detection signal FD. Leading edge blanking time logic 130 is arranged to provide leading edge blanking time signal LEB such that leading edge blanking signal LEB is asserted during a leading edge blanking time and unasserted otherwise, the assertion of leading edge blanking time signal LEB begins when gate signal GATE is asserted, and such that the assertion of leading edge blanking time signal LEB ends when falling edge detector 110 detects the falling edge in current sense signal CS.

Figure 2:
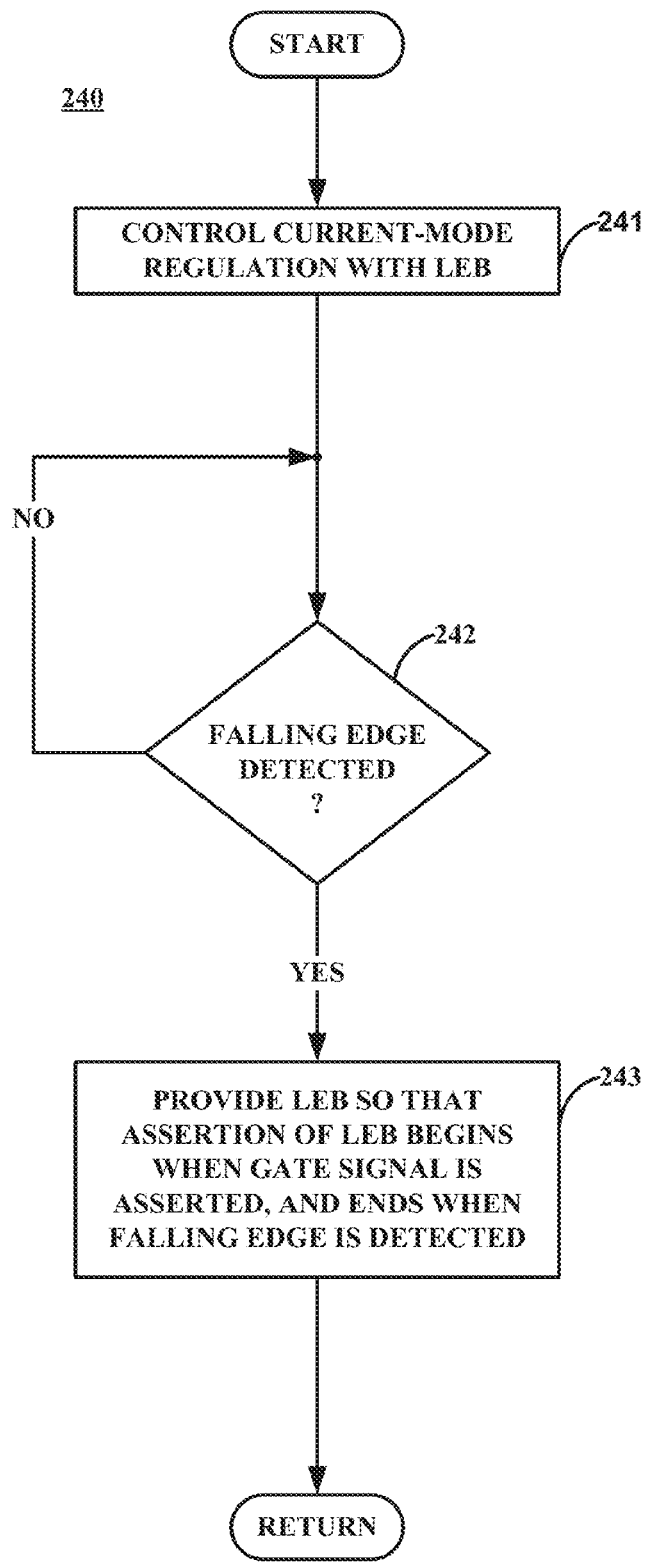
FIG. 2 is a flowchart illustrating an example of a process that may be employed by an example of the current-mode SMPS controller of FIG. 1.

FIG. 2 is a flowchart illustrating an example of process 240, which may be used by an example of current-mode switch-mode power supply controller 101 of FIG. 1. After a start block, a switch controller (e.g., switch controller 120 of FIG. 1) begins controlling regulation of an output voltage by turning a primary switch on and off via a gate signal (e.g., signal GATE of FIG. 1) based on at least a current sense signal (e.g., current sense signal CS of FIG. 1) and a leading edge blanking signal (e.g., signal LEB of FIG. 1), such that the switch controller is arranged to cause the primary switch to remain on while the leading edge blanking signal is asserted (241). Next, a determination is made as to whether or not a falling edge is detected in the current sense signal (242). If not, the process remains at decision block 242 until a falling edge is detected in the current sense signal. When a falling edge is detected in the current sense signal, leading edge blanking time logic (e.g., leading edge blanking time logic 130 of FIG. 1) unasserts the leading edge blanking time signal (243). In some examples, the leading edge blanking time logic provides the leading edge blanking time signal such that the leading edge blanking signal is asserted during a leading edge blanking time and unasserted otherwise, the assertion of the leading edge blanking time signal begins when the primary switch control signal is asserted, and such that the assertion of the leading edge blanking time signal ends when the falling edge detector detects the falling edge in the current sense signal. The processing then advances to a return block, where other processing is resumed.

In some examples, process 240 also uses a maximum leading edge blanking time. In these examples, in addition to ending the assertion of the leading edge blanking signal upon detection of a falling edge in the current sense signal, leading edge blanking time logic is arranged to provide the leading edge blanking signal such that the assertion of the leading edge blanking signal also ends if a maximum leading edge blanking time has occurred since the assertion of the leading edge blanking signal without detection of the falling edge in the current sense signal.

Figure 3:
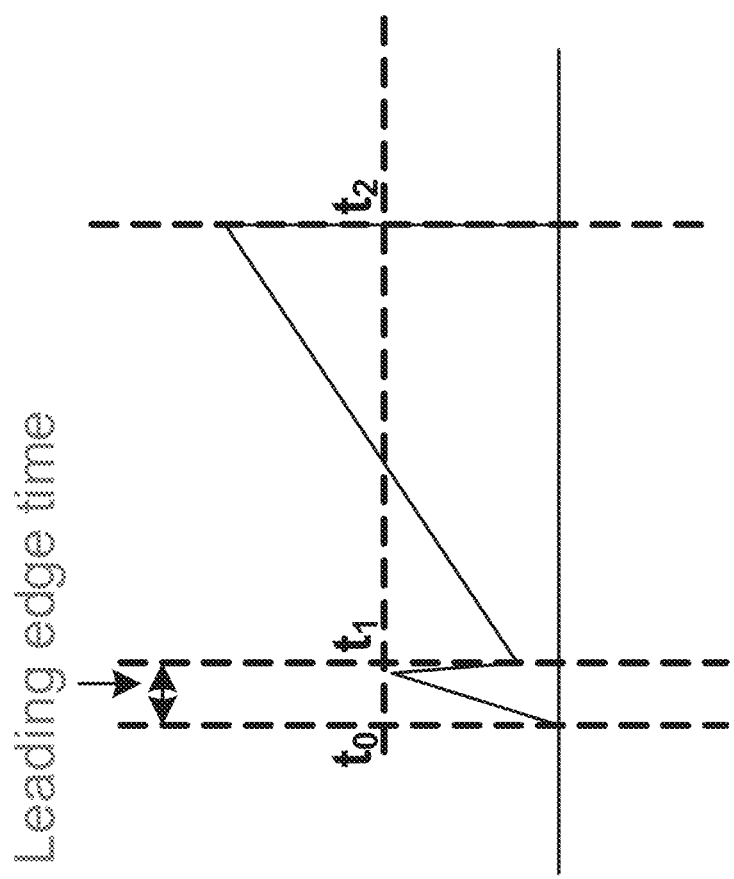
FIG. 3 is a timing diagram of example of leading edge blanking time for an example of current-mode SMPS controller of FIG. 1.

FIG. 3 is a timing diagram of an example of leading edge blanking time for an example of current-mode SMPS controller of FIG. 1. FIG. 3 illustrates an example waveform of current sense signal CS of FIG. 1 over time.

Current-mode SMPS controller 101 is arranged to control current-mode regulation while providing a leading edge blanking time. The leading edge blanking time is used because, when the primary switching transistor turns on, a current spike may occur during the transistor turn-on transition. This leading edge current spike may be caused by inherent or stray capacitance within switch controller 120. This current spike, if not filtered out, could cause the switch controller 120 to attempt to switch off the power transistor unwanted, due to the excessive detected current.

LEB logic 130 is used so that the leading edge blanking time corresponds to the real leading edge peak current time, as illustrated in FIG. 3. If the leading edge blanking time were instead shorter than the real leading edge peak current time there would be a risk that switch controller 120 may fail to filter out this leading edge peak current, so that the primary switch power would be turned off when the primary switch should not be turned off. If the leading edge blanking time were instead longer than the real leading edge peak current time, there may be a risk that switch controller 120 will fail to perform regulation under very low current sensing values.

LEB Logic 130 is arranged to provide signal LEB such that signal LEB is unasserted when a falling edge is detected in signal CS. In this way, the LEB time depends on the real leading edge peak current time, and is an adaptive LEB time that does not depend on other factors such as process and temperature tolerance.

Figure 4:
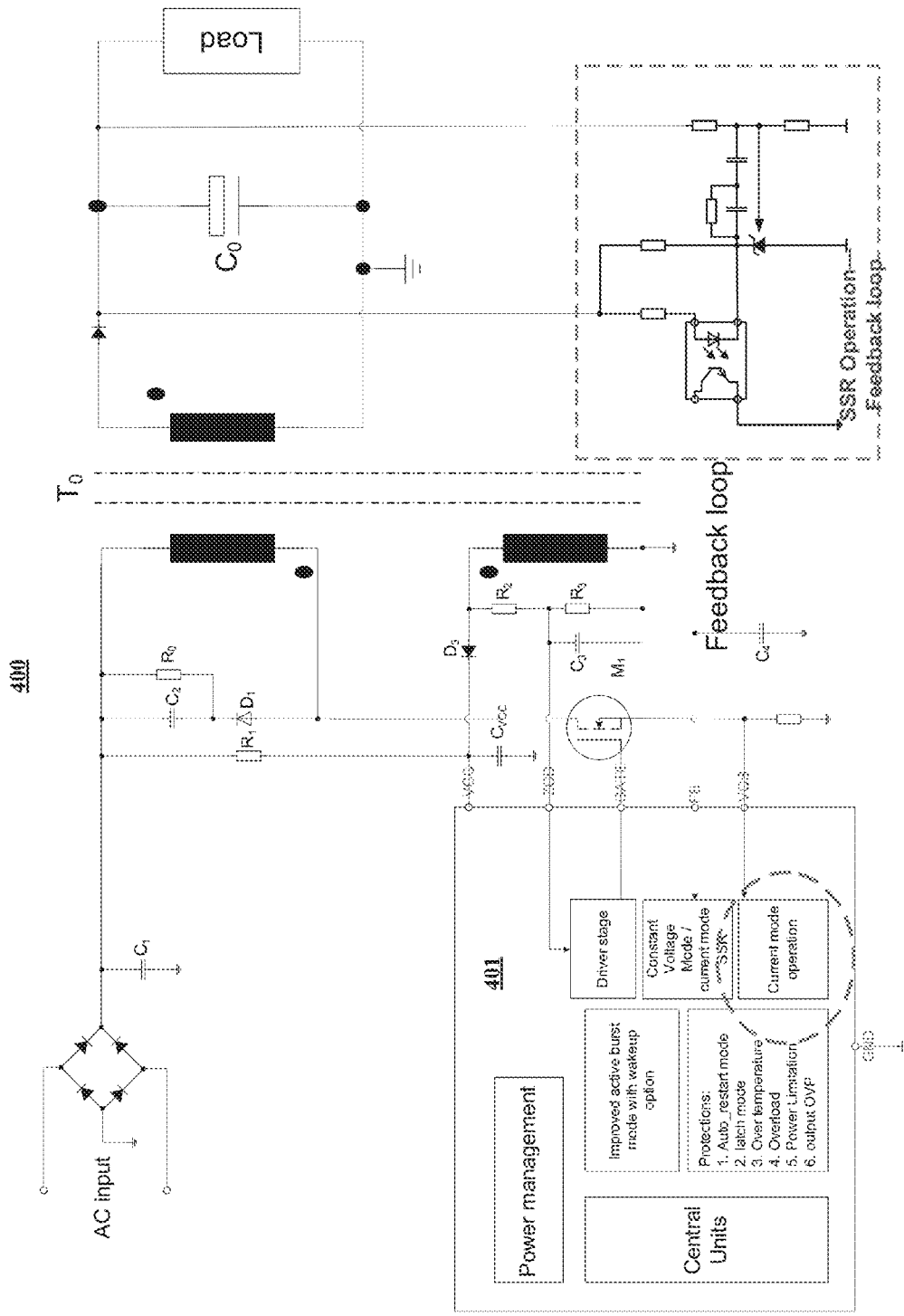
FIG. 4 is a block diagram of an example of a current-mode SMPS that includes an example of the current-mode SMPS controller of FIG. 1.

FIG. 4 is a block diagram of an example of current-mode SMPS 400, which includes an example of the current-mode SMPS controller 401, where current-mode SMPS controller 401 may be employed as an example of current-mode SMPS controller 101 of FIG. 1.

Current-mode SMPS controller 401 may operate, in part, substantially as described above for current-mode SMPS controller 101 of FIG. 1. Current sense voltage VCS is an example of current sense signal CS of FIG. 1. FIG. 4 illustrates an example of current-mode SMPS 400 having a current-mode flyback topology. However, the disclosure is not so limited, and any current-mode topology may be used in various examples of current-mode SMPS 400.

Figure 5:
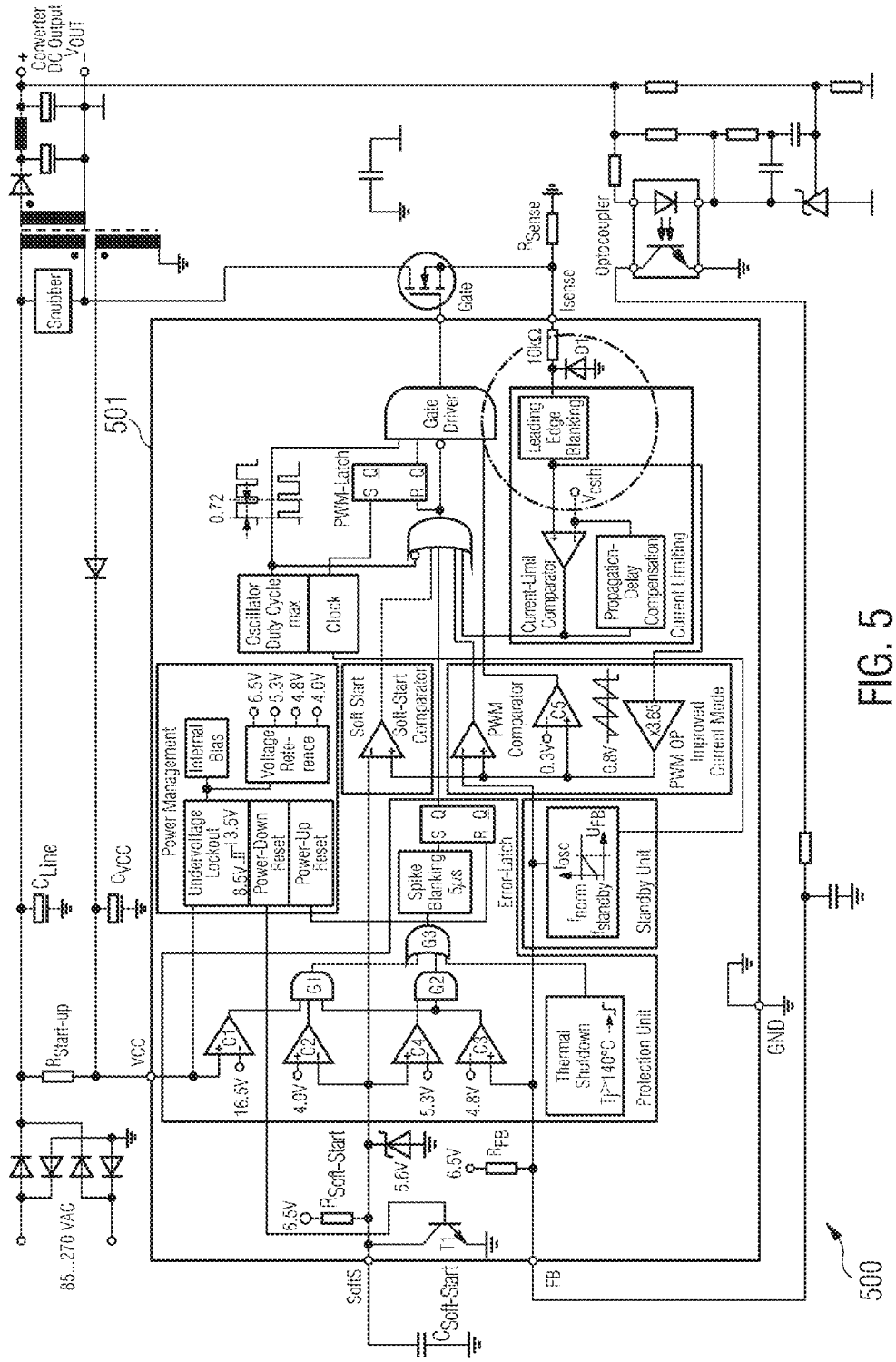
FIG. 5 is a block diagram illustrating an example of the current-mode SMPS of FIG. 4.

FIG. 5 is a block diagram illustrating an example of current-mode SMPS 500, which may be employed as an example of current-mode SMPS 400 of FIG. 4. Current-mode SMPS 500 includes SMPS controller 501, which may be employed as an example of current-mode SMPS controller 401 of FIG. 1. Current-mode SMPS controller 501 may operate, in part, substantially as described above for current-mode SMPS controller 101 of FIG. 1. FIG. 5 illustrates an example current-mode SMPS 500 having a current-mode flyback topology. However, the disclosure is not so limited, and any current-mode topology may be used in various examples of current-mode SMPS 500, including, as but one example among many, a buck topology.

SMPS 500 may be used in numerous applications, including LED lighting applications, charger applications, AC/DC adaptor applications, DC/DC adaptor applications, and/or the like. However, the disclosure is not so limited, and any application for which a current-mode SMPS may be used may be employed within the scope and spirit of the disclosure.

Figure 6:
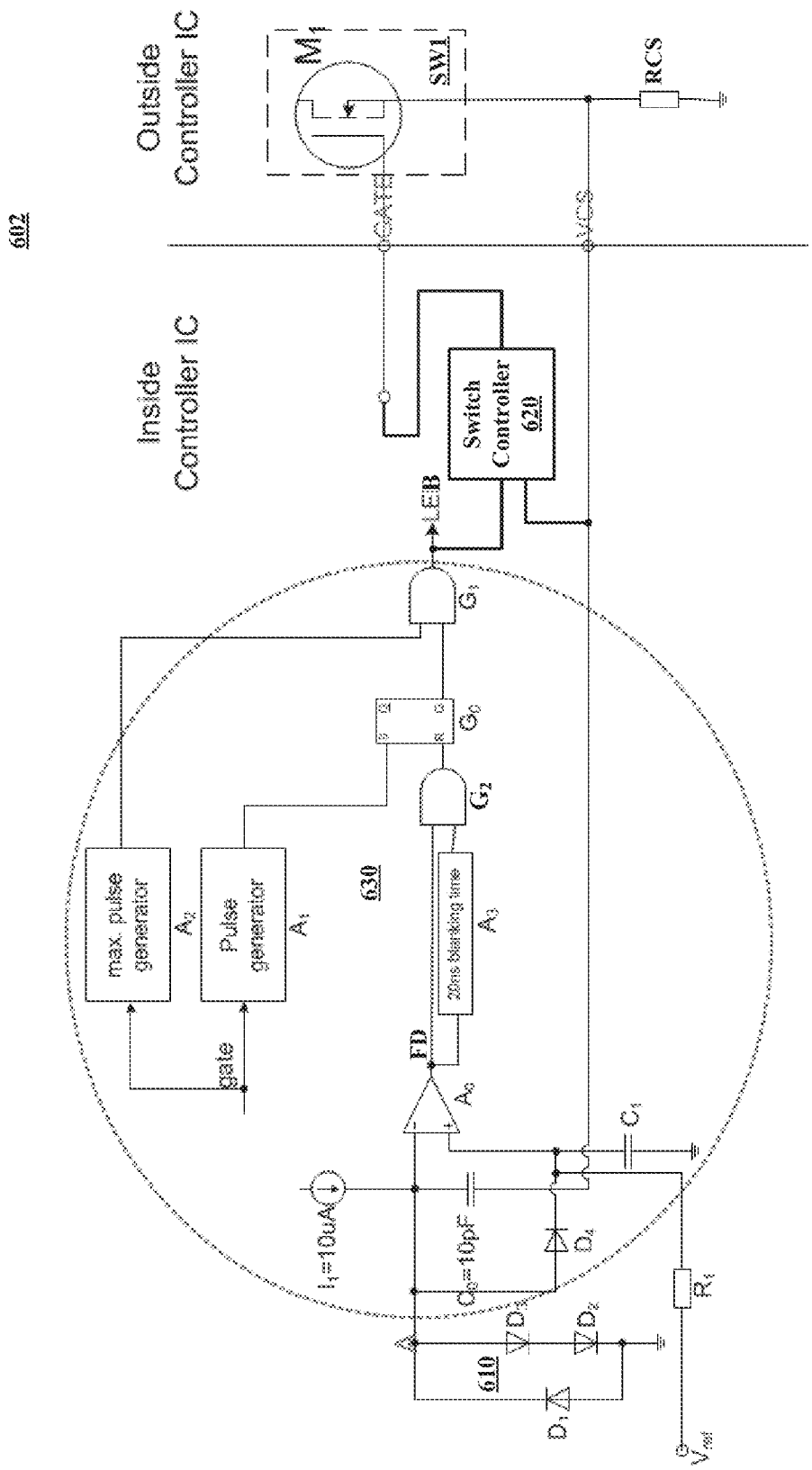
FIG. 6 is a block diagram of an example of a portion of the current-mode SMPS of FIG. 4 and/or FIG. 5.

FIG. 6 is a block diagram of an example of portion 602 of an example of current-mode SMPS 400 of FIG. 4. Portion 602 includes falling edge detector 610, switch controller 620, leading edge blanking time logic 630, resistor R1, current sense resistor RCS, capacitor C0, capacitor C1, and primary switch transistor SW1.

Falling edge detector 610, switch controller 620, and leading edge blanking time logic 630 may operate, in some examples, in the same or substantially similar manner as described with regard to falling edge detector 110, switch controller 120, and leading edge blanking time logic 130 of FIG. 1. The example of falling edge detector 610 illustrated in FIG. 6 includes diodes D1-D4, current source I1, comparator A0, 20 ns blanking time generator A3, and AND gate G2. The example of leading edge blanking logic 630 illustrated in FIG. 6 includes RS flip-flop G0, AND gates G1, pulse generator A1, and maximum pulse generator A2. The example of primary switch SW1 illustrated in FIG. 6 includes transistor M1. Voltage VCS is an example of current sense signal CS of FIG. 1. Current sense resistor RCS is arranged to sense the current through transistor M1 and provides current sense voltage VCS such that the voltage VCS is proportional to the current through transistor M1.

In some examples, Point A voltage is capacitively coupled to current sense voltage VCS via capacitor C0. In some examples, diode D1 is arranged as negative clamp for point A voltage, to ensure that point A voltage is above −0.7V (at room temperature, where one diode drop is approximately 0.7V at room temperature). In some examples, diodes D2 and D3 are arranged to operate as positive clamp for point A voltage, to ensure that point A voltage is less than 1.4V (at room temperature, where one diode drop is approximately 0.7V at room temperature). In some examples, Current source I1 and diodes D2 and D3 are arranged to cause point A voltage to be around 1.4V when current sense voltage VCS is under DC voltage.

In some examples, diodes D2 and D3 are arranged to block the rising behavior of point A. Current source I1 does not clamp the falling edge of point A, and so when VCS has a leading edge spike, the rising edge of VCS will not cause any influence of point A, but a falling edge of VCS will cause point A voltage to fall down. Diode D4 and sampling capacitor C1 are arranged to detect the maximum voltage of point A voltage and to sample and hold voltage (VA-0.7V) within a short time of detecting the maximum voltage of point A voltage.

Comparator A0 is arranged to detect the falling edge of point A voltage and the VCS leading edge spike. Comparator A0 has a first comparator/comparison input that is coupled to point A voltage, a second comparator/comparison input that is coupled to sampling capacitor C1 and diode D4, and an output (signal FD) that is asserted when the falling edge is detected. Comparator A0 detects a falling edge in point A voltage. As previously discussed, current-mode SMPS controller 101 is arranged such that a falling edge occurs in point A voltage when a falling edge occurs in current sense voltage VCS, where current sense voltage VCS is proportional to the current through primary switch transistor A1. Accordingly, by detecting a falling edge in point A voltage, comparator A0 detects a falling edge in the current through primary switch transistor M1.

The 20 ns blanking time generator A3 is arranged to blank high-frequency oscillation over current sense voltage VCS during the leading edge spike period. The 20 ns blanking time generator A3 generates a 20 ns pulse when comparator A0 is asserted. Comparator A0 is arranged to compare point A voltage with the voltage at the second input of comparator A0. Resistor R1 is coupled between reference voltage Vref and the second input of comparator A0. Comparator A0 is arranged to detect a falling edge of voltage VCS; when voltage VCS rising edge has very high falling slope rate, point A voltage can be pulled up to VA-0.7V within very short time, and this higher voltage is be used to a detect falling edge of voltage VCS when the VCS rising edge has very high falling slope rate.

In one example, the detected threshold slope rate at which a falling edge is detected is given by 10 µA/10 pF=1V/ρs. This non-limiting example is given by way of example only, and in various other examples within the scope and spirit of the disclosure, other suitable values for the threshold falling slope rate may be used.

The output of falling edge detector 610 is the output of AND gate G2. The output of falling edge detector 610 is asserted when a falling edge is detected. Falling edge detector 610 is arranged such that the output of falling edge detector 610 is asserted when the output of comparator A0 is asserted and remains asserted for 20 ns. As previously discussed, the output of comparator A0 is asserted when voltage VCS reaches a threshold falling slope rate. Falling edge detector 610 is arranged to assert the output of falling edge detector 610 when the output of comparator A0 is asserted and remains asserted for 20 ns so that high-frequency oscillation over current sense voltage VCS during the leading edge spike period is blanked.

Although an example of 20 ns of blanking high-frequency oscillation over current sense voltage VCS during the leading edge spike period, the example of 20 ns is given by way of example only, and in various examples, different suitable amounts of time other than 20 ns may be used within the scope and spirit of the disclosure.

In this way, falling edge detector 610 is arranged to detect the falling edge in the current sense signal when a falling slope rate of the current sense signal exceeds a threshold falling slope rate for a determined period of time (e.g., 20 ns in one specific example).

Pulse generator A1 is arranged to generate one very short pulse, which is used to set RS flip-flop G0. Maximum pulse generator block A2 is arranged to generate one pulse, which is used as the maximum LEB time. The pulse generator by maximum pulse generator block A2 begins with the start of the LEB time. If within this maximum LEB time, there is not detected any falling edge of VCS leading edge, the maximum LEB time will be used as LEB time. In one non-limiting example, the maximum LEB time is 220 ns, but the disclosure is not so limited, and in various examples within the scope of the disclosure, other suitable values for the maximum LEB time may be employed. RS flip-flop G0 is arranged to generate one pulse whose time is from rising edge of gate signal GATE to the falling edge of the leading edge spike of voltage VCS, which is also called the Leading Edge Blanking Time (LEB).

Figure 7A:
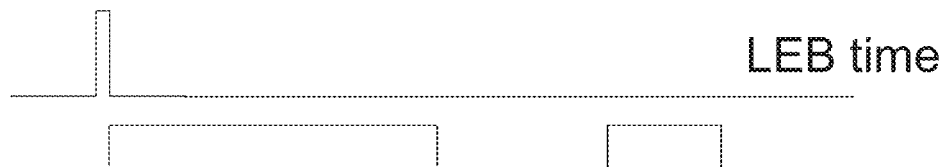
FIGS. 7A-7G are timing diagrams of example signals for an example of the current-mode SMPS controller of FIGS. 4, 5, and/or 6, in accordance with aspects of the invention.
Figure 7B:
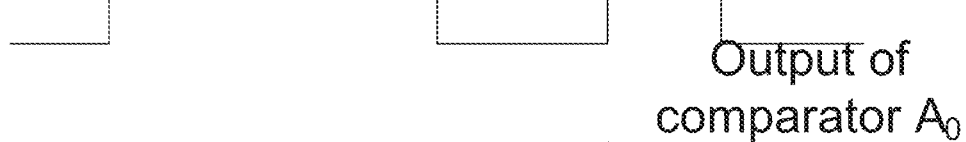
Figure 7C:
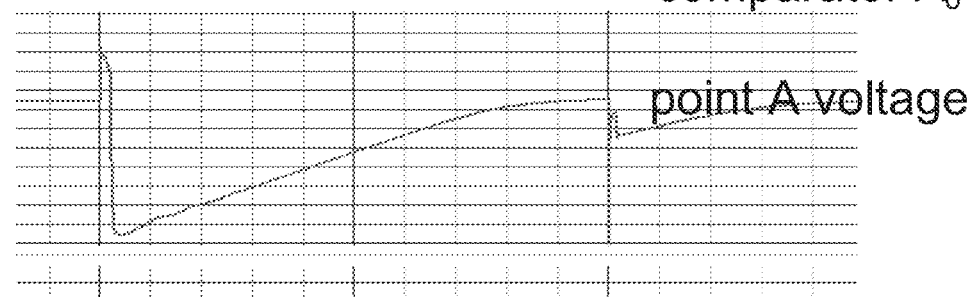
Figure 7D:
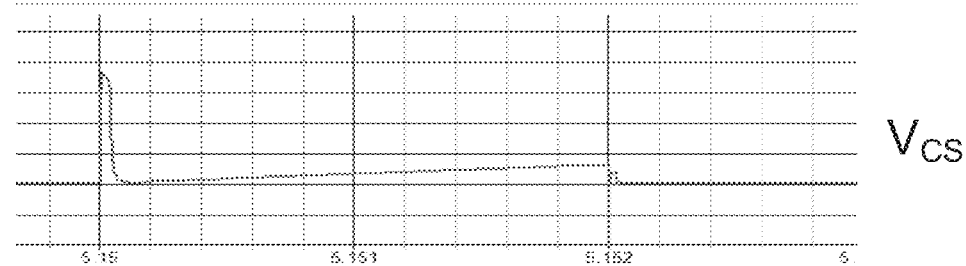
Figure 7E:
Figure 7F:
Figure 7G:

FIGS. 7A-7G are timing diagrams of example waveforms for example signals for an example of the current-mode SMPS controller of FIGS. 4, 5, and/or 6. FIG. 7A shows an example of a waveform of an example of signal LEB over time. FIG. 7B shows an example of a waveform of an example of the output of comparator A0 over time. FIG. 7C shows an example of a waveform of an example of point A voltage over time. FIG. 7D shows an example of a waveform of an example of current sense voltage VCS over time. FIG. 7E shows an example of a waveform of an example of the maximum pulse signal over time. FIG. 7F shows an example of a waveform of an example of the short pulse signal over time. FIG. 7G shows an example of a waveform of an example of gate signal GATE over time.

As shown in FIGS. 7A-7G, when there is a rising edge in gate signal GATE, then signal LEB is asserted, the short pulse signal begins, and the maximum pulse signal begins. Current sense voltage VCS then rises with a voltage spike, but this voltage spike occurs during the leading edge blanking time, and so signal GATE is not turned off in response to the current spike in voltage VCS. Point A voltage only rises to 1.4V during the spike in voltage VCS because point A voltage is clamped to 1.4V. In this way, the rising edge in point A voltage is blocked, but the falling edge in point A voltage is not blocked. After the peak of the spike in current sense voltage VCS ends, a falling edge occurs in current sense voltage VCS. The falling edge in current sense voltage VCS is followed by point A voltage. The output of comparator A0 is asserted when the falling edge is detected by the falling edge to exceed a particular falling slope rate. Because a falling edge is detected within the duration of the maximum pulse signal in the particular examples illustrated in FIGS. 7A-7G, signal LEB is unasserted when the output of comparator A0 is asserted, thus ending the leading edge blanking time.

Some examples of the disclosure are described below.

Example 1

A device for leading edge blanking, comprising: a current-mode switch-mode power supply controller, including: a switch controller that is arranged to control regulation of an output signal via current-mode regulation by turning a primary switch on and off via a gate signal based on at least a current sense signal and a leading edge blanking signal, such that the switch controller is arranged to cause the primary switch to remain on while the leading edge blanking signal is asserted; a falling edge detector that is arranged to detect a falling edge in the current sense signal; and leading edge blanking time logic that is arranged to provide the leading edge blanking time signal such that the leading edge blanking signal is asserted during a leading edge blanking time and unasserted otherwise, the assertion of the leading edge blanking time signal begins when the gate signal is asserted, and such that the assertion of the leading edge blanking time signal ends when the falling edge detector detects the falling edge in the current sense signal.

Example 2

The device of example 1, wherein the leading edge blanking time logic is further arranged such that the assertion of the leading edge blanking signal also ends if a maximum leading edge blanking time has occurred since the assertion of the leading edge blanking signal without detection of the falling edge in the current sense signal.

Example 3

The device of any combination of examples 1-2, wherein the falling edge detector is arranged to detect the falling edge in the current sense signal when a falling slope rate of the current sense signal exceeds a threshold falling slope rate for a determined period of time.

Example 4

The device of any combination of examples 1-3, further comprising a current-mode switch-mode power supply that includes the current-mode switch-mode power supply controller.

Example 5

The device of any combination of examples 1-4, wherein the falling edge detector includes a comparator having a first input and a second input, wherein the first input of the comparator is capacitively coupled to the current sense signal.

Example 6

The device of example 5, wherein the current-mode switch-mode power supply controller further includes a capacitor that is arranged to capacitively couple the first input of the comparator to the current sense signal.

Example 7

The device of any combination of examples 5-6, wherein the falling edge detector further includes a current source having an output that is coupled to the first input of the comparator.

Example 8

The device of any combination of examples 5-7, wherein the falling edge detector further includes a positive clamp for a voltage at the first input of the comparator.

Example 9

The device of example 8, wherein the falling edge detector further includes a negative clamp for the voltage at the first input of the comparator.

Example 10

The device of any combination of examples 8-9, wherein the current-mode switch-mode power supply controller further includes a sampling capacitor that is coupled to the second input of the comparator.

Example 11

The device of example 10, wherein the current-mode switch-mode power supply controller further includes a diode that is coupled between the first input of the comparator and the second input of the comparator.

Example 12

The device of example 5, wherein the leading edge blanking time logic is arranged such that the assertion of the leading edge blanking time signal ends when an output of the comparator is asserted and remains asserted for a determined period of time.

Example 13

The device of example 12, wherein the leading edge blanking time logic is further arranged such that the assertion of the leading edge blanking time also ends when a maximum leading edge blanking time has occurred since the assertion of the leading edge blanking signal without the output of the comparator being asserted.

Example 14

A method for leading edge blanking, comprising: controlling regulation of an output signal, including: controlling regulation of the output signal via current-mode regulation by turning a primary switch on and off via a gate signal based on at least a current sense signal and a leading edge blanking signal, such that the primary switch is controlled to remain on while the leading edge blanking signal is asserted; detecting a falling edge in the current sense signal; and providing the leading edge blanking time signal such that the leading edge blanking signal is asserted during a leading edge blanking time and unasserted otherwise, the assertion of the leading edge blanking time signal begins when the gate signal is asserted, and such that the assertion of the leading edge blanking time signal ends when the falling edge in the current sense signal is detected.

Example 15

The method of example 15, wherein providing the leading edge blanking time signal is further accomplished such that the assertion of the leading edge blanking signal also ends if a maximum leading edge blanking time has occurred since the assertion of the leading edge blanking signal without detection of the falling edge in the current sense signal.

Example 16

The method of any combination of examples 14-15, wherein detecting a falling edge in the current sense signal includes comparing a first signal at a first comparison input with a second signal at a second comparison input, wherein the first comparison input is capacitively coupled to the current sense signal, and wherein a sampling capacitor is coupled to the second comparison input.

Example 17

The method of any combination of examples 14,-16 wherein detecting a falling edge in the current sense signal includes detecting the falling edge in the current sense signal when a falling slope rate of the current sense signal exceed a threshold falling slope rate for a determined period of time.

Example 18

A device for leading edge blanking, comprising: means for controlling regulation of an output signal, including: means for controlling regulation of the output signal via current-mode regulation by turning a primary switch on and off via a gate signal based on at least a current sense signal and a leading edge blanking signal, such that the primary switch is controlled to remain on while the leading edge blanking signal is asserted; means for detecting a falling edge in the current sense signal; and means for providing the leading edge blanking time signal such that the leading edge blanking signal is asserted during a leading edge blanking time and unasserted otherwise, the assertion of the leading edge blanking time signal begins when the gate signal is asserted, and such that the assertion of the leading edge blanking time signal ends when the falling edge detector detects the falling edge in the current sense signal.

Example 19

The device of example 18, wherein the means for providing the leading edge blanking time signal includes means for providing the leading edge blanking time signal such that the assertion of the leading edge blanking signal also ends if a maximum leading edge blanking time has occurred since the assertion of the leading edge blanking signal without detection of the falling edge in the current sense signal.

Example 20

The device of any combination of examples 18-19, wherein the means for detecting the falling edge in the current sense signal includes means for detecting the falling edge in the current sense signal when a falling slope rate of the current sense signal exceeds a threshold falling slope rate for a determined period of time.

Various examples have been described. These and other examples are within the scope of the following claims.

What is claimed is:

1. A device comprising:
a current-mode switch-mode power supply controller, including:
a switch controller that is arranged to control regulation of an output signal via current-mode regulation by turning a primary switch on and off via a gate signal based on at least a current sense signal and a leading edge blanking signal, such that the switch controller is arranged to cause the primary switch to remain on while the leading edge blanking signal is asserted;
a falling edge detector that is arranged to detect a falling edge in the current sense signal; and
leading edge blanking time logic that is arranged to provide the leading edge blanking time signal such that the leading edge blanking signal is asserted during a leading edge blanking time and unasserted otherwise, the assertion of the leading edge blanking time signal begins when the gate signal is asserted, and such that the assertion of the leading edge blanking time signal ends when the falling edge detector detects the falling edge in the current sense signal.

2. The device of claim 1, wherein
the leading edge blanking time logic is further arranged such that the assertion of the leading edge blanking signal also ends if a maximum leading edge blanking time has occurred since the assertion of the leading edge blanking signal without detection of the falling edge in the current sense signal.

3. The device of claim 1, wherein
the falling edge detector is arranged to detect the falling edge in the current sense signal when a falling slope rate of the current sense signal exceeds a threshold falling slope rate for a determined period of time.

4. The device of claim 1, further comprising a current-mode switch-mode power supply that includes the current-mode switch-mode power supply controller.

5. The device of claim 1, wherein the falling edge detector includes a comparator having a first input and a second input, wherein the first input of the comparator is capacitively coupled to the current sense signal.

6. The device of claim 5, wherein the current-mode switch-mode power supply controller further includes a capacitor that is arranged to capacitively couple the first input of the comparator to the current sense signal.

7. The device of claim 5, wherein the falling edge detector further includes a current source having an output that is coupled to the first input of the comparator.

8. The device of claim 5, wherein the falling edge detector further includes a positive clamp for a voltage at the first input of the comparator.

9. The device of claim 8, wherein the falling edge detector further includes a negative clamp for the voltage at the first input of the comparator.

10. The device of claim 5, wherein the current-mode switch-mode power supply controller further includes a sampling capacitor that is coupled to the second input of the comparator.

11. The device of claim 10, wherein the current-mode switch-mode power supply controller further includes a diode that is coupled between the first input of the comparator and the second input of the comparator.

12. The device of claim 5, wherein the leading edge blanking time logic is arranged such that the assertion of the leading edge blanking time signal ends when an output of the comparator is asserted and remains asserted for a determined period of time.

13. The device of claim 12, wherein the leading edge blanking time logic is further arranged such that the assertion of the leading edge blanking time also ends when a maximum leading edge blanking time has occurred since the assertion of the leading edge blanking signal without the output of the comparator being asserted.

14. A method, comprising:
controlling regulation of an output signal, including:
controlling regulation of the output signal via current-mode regulation by turning a primary switch on and off via a gate signal based on at least a current sense signal and a leading edge blanking signal, such that the primary switch is controlled to remain on while the leading edge blanking signal is asserted;
detecting a falling edge in the current sense signal; and
providing the leading edge blanking time signal such that the leading edge blanking signal is asserted during a leading edge blanking time and unasserted otherwise, the assertion of the leading edge blanking time signal begins when the gate signal is asserted, and such that the assertion of the leading edge blanking time signal ends when the falling edge in the current sense signal is detected.

15. The method of claim 14, wherein
providing the leading edge blanking time signal is further accomplished such that the assertion of the leading edge blanking signal also ends if a maximum leading edge blanking time has occurred since the assertion of the leading edge blanking signal without detection of the falling edge in the current sense signal.

16. The method of claim 14, wherein detecting a falling edge in the current sense signal includes comparing a first signal at a first comparison input with a second signal at a second comparison input, wherein the first comparison input is capacitively coupled to the current sense signal, and wherein a sampling capacitor is coupled to the second comparison input.

17. The method of claim 14, wherein
detecting a falling edge in the current sense signal includes detecting the falling edge in the current sense signal when a falling slope rate of the current sense signal exceeds a threshold falling slope rate for a determined period of time.

18. A device, comprising:

means for controlling regulation of an output signal, including:

means for controlling regulation of the output signal via current-mode regulation by turning a primary switch on and off via a gate signal based on at least a current sense signal and a leading edge blanking signal, such that the primary switch is controlled to remain on while the leading edge blanking signal is asserted;

means for detecting a falling edge in the current sense signal; and means for providing the leading edge blanking time signal such that the leading edge blanking signal is asserted during a leading edge blanking time and unasserted otherwise, the assertion of the leading edge blanking time signal begins when the gate signal is asserted, and such that the assertion of the leading edge blanking time signal ends when the falling edge detector detects the falling edge in the current sense signal.

19. The device of claim 18, wherein the means for providing the leading edge blanking time signal includes means for providing the leading edge blanking time signal such that the assertion of the leading edge blanking signal also ends if a maximum leading edge blanking time has occurred since the assertion of the leading edge blanking signal without detection of the falling edge in the current sense signal.

20. The device of claim 18, wherein the means for detecting the falling edge in the current sense signal includes means for detecting the falling edge in the current sense signal when a falling slope rate of the current sense signal exceeds a threshold falling slope rate for a determined period of time.

* * * * *